(12) United States Patent
Marandi

(10) Patent No.: US 6,648,377 B2
(45) Date of Patent: Nov. 18, 2003

(54) SADDLE WITH GASKETED BELL-END PORTIONS

(76) Inventor: Ali Marandi, 4482 Elm Tree La., Irvine, CA (US) 92715

( * ) Notice: Subject to any disclaimer, the term of this patent is extended or adjusted under 35 U.S.C. 154(b) by 0 days.

(21) Appl. No.: 09/730,022

(22) Filed: Dec. 4, 2000

(65) Prior Publication Data

US 2002/0067040 A1 Jun. 6, 2002

Related U.S. Application Data

(60) Provisional application No. 60/170,228, filed on Dec. 10, 1999.

(51) Int. Cl.⁷ ................................................. F16L 41/00
(52) U.S. Cl. ...................... 285/197; 285/376; 285/401; 285/415
(58) Field of Search ................................. 285/197, 198, 285/330, 376, 401, 415, 420, 114, 133.11

(56) References Cited

U.S. PATENT DOCUMENTS

| 710,631 | A | | 10/1902 | Tietz | |
|---|---|---|---|---|---|
| 896,333 | A | * | 8/1908 | Smith | 285/376 X |
| 1,221,935 | A | * | 4/1917 | White | 285/376 |
| 1,326,392 | A | * | 12/1919 | Combs, Jr. | 285/197 |
| 1,511,723 | A | * | 10/1924 | Draver | 285/197 X |
| 1,881,508 | A | * | 10/1932 | Gredell | 285/415 |
| 2,042,125 | A | * | 5/1936 | Roach | 285/330 |
| 3,967,839 | A | * | 7/1976 | Dunmire | 285/330 X |
| 4,527,745 | A | * | 7/1985 | Butterfield et al. | 285/197 X |
| 4,789,189 | A | * | 12/1988 | Robertson | 285/197 |
| 5,183,298 | A | * | 2/1993 | Harrington | 285/420 X |
| 5,468,025 | A | * | 11/1995 | Adinolfe et al. | 285/114 |
| 6,231,083 | B1 | * | 5/2001 | Marandi | 285/133.11 X |
| 6,302,445 | B1 | * | 10/2001 | Kugele et al. | 285/376 X |

FOREIGN PATENT DOCUMENTS

CH 367363 3/1963

* cited by examiner

Primary Examiner—Lynne H. Browne
Assistant Examiner—David E. Bochna
(74) Attorney, Agent, or Firm—Boniard I. Brown

(57) ABSTRACT

A saddle assembly is secured about a liquid conduit by its contoured base portion and a half clamp and threaded fasteners. A pipe or nipple is received in a gasketed bell-end outlet and is retained against separation by respective components and devices.

19 Claims, 3 Drawing Sheets

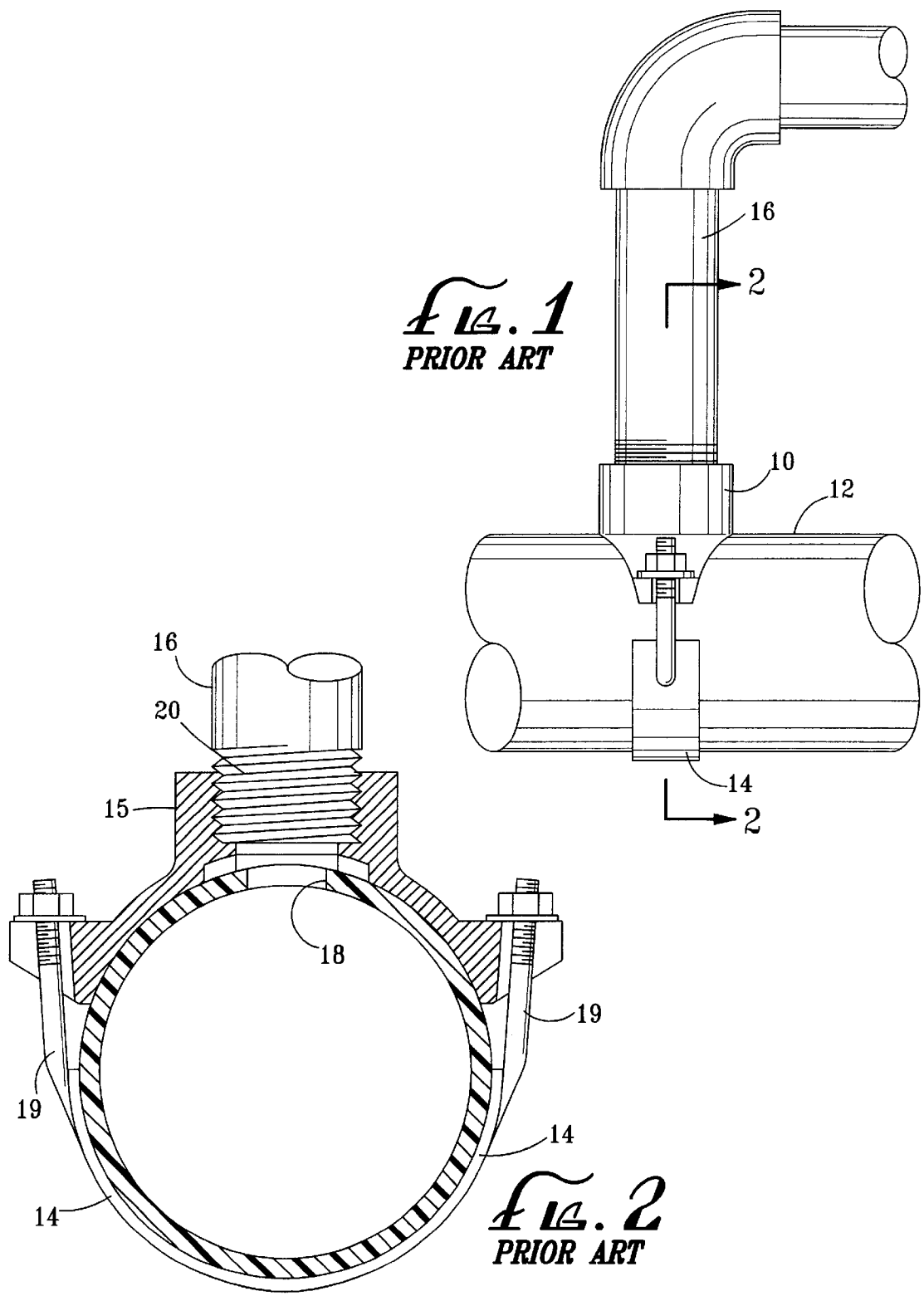

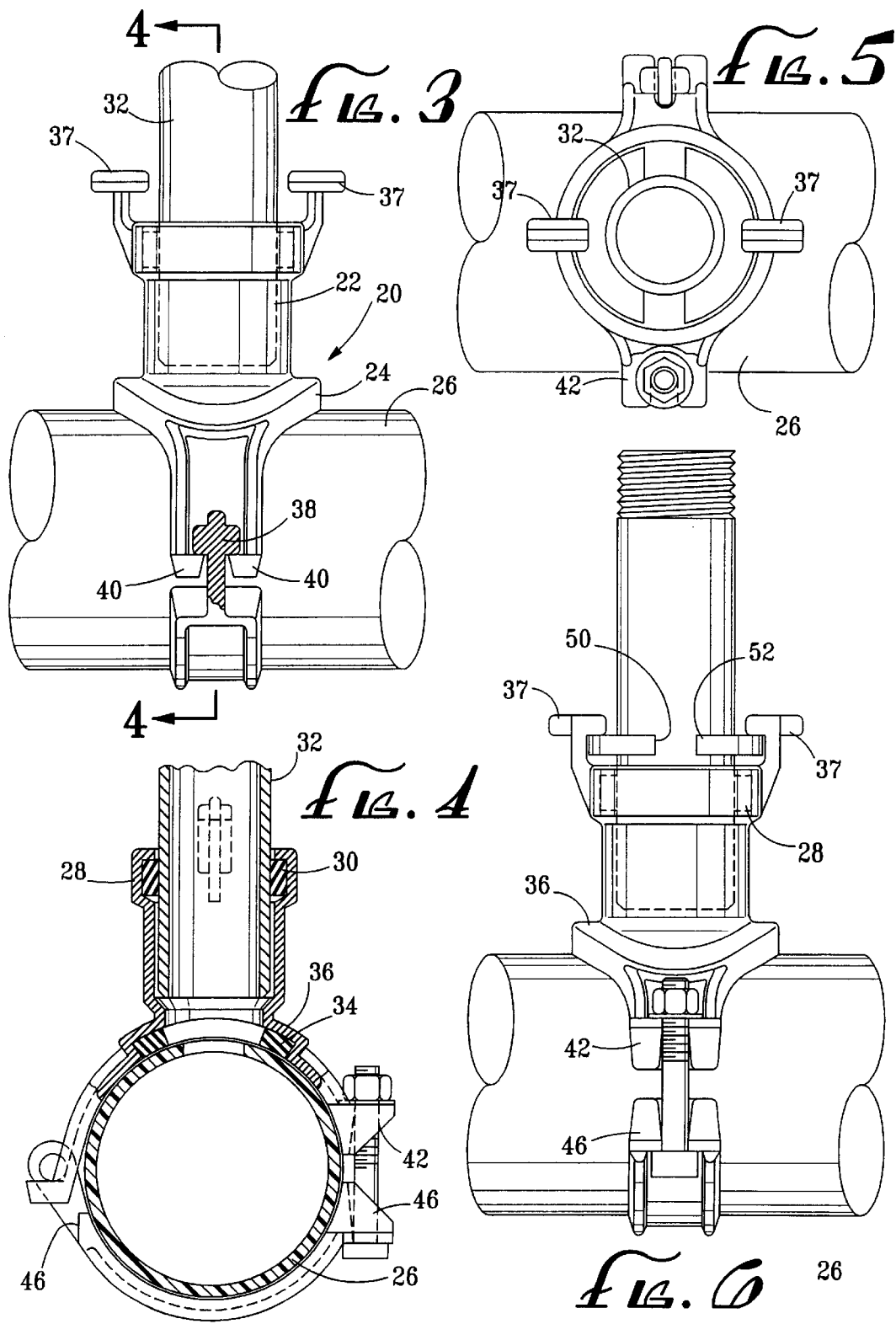

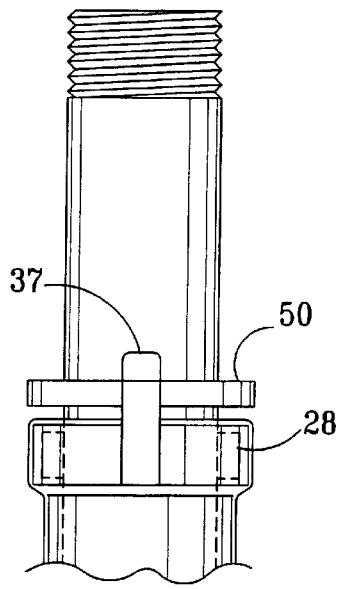
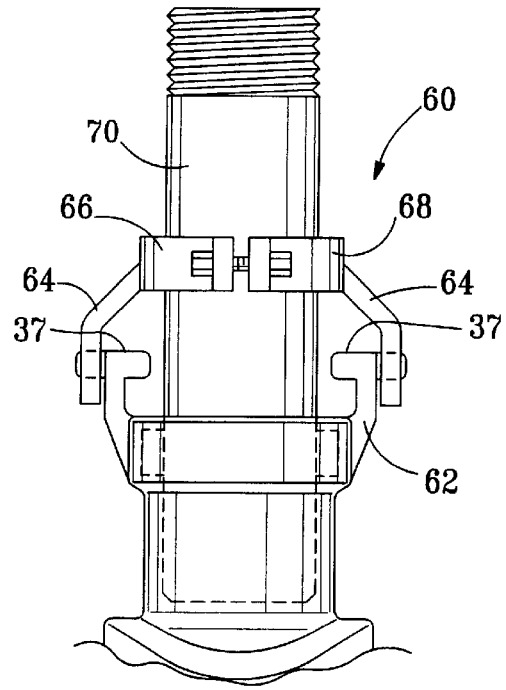
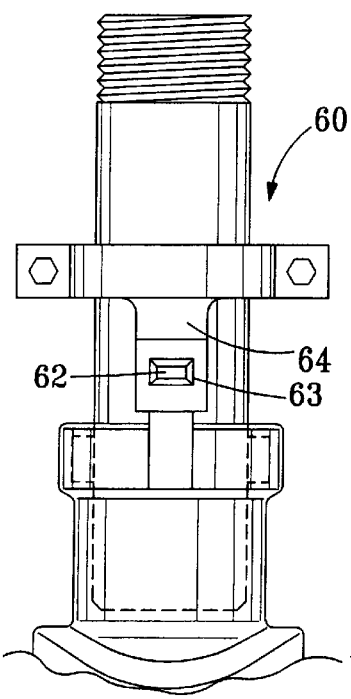
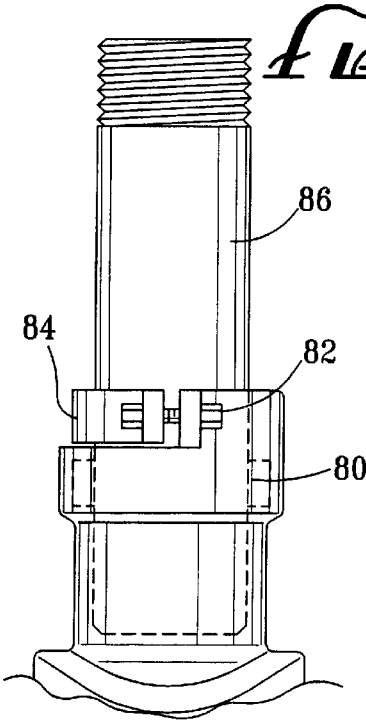
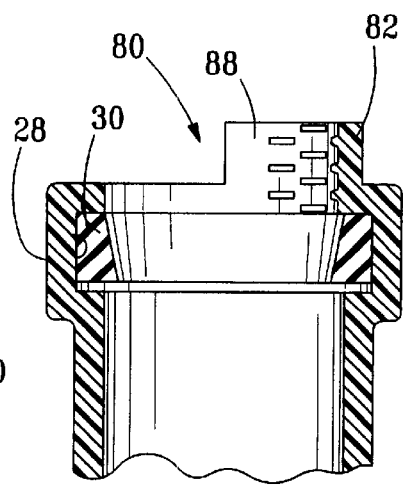
fig.7
fig.8
fig.9
fig.10
fig.11

SADDLE WITH GASKETED BELL-END PORTIONS

RELATED APPLICATIONS

Reference is made to my Provisional Application No. 60/170,228, filed Dec. 10, 1999, entitled "Saddles With Gasketed Bell-End Portions".

BACKGROUND OF THE INVENTION

Saddles for liquid conduits, such as those utilized between a main line conduit and lateral lines of irrigation systems, as shown in FIGS. 1 and 2, comprise a saddle member 10 secured about a main line conduit 12, and secured by a lower half-clamp 14 and threaded fasteners. The saddle has a threaded opening portion 15 to receive a threaded end portion of pipe 16 for connection for a lateral conduit extending from the main line. An opening 18 is drilled in the main conduit 12 for passage of water into pipe 16. The lower securement may typically be formed by a clamp casting, by heavy wire or by a continuation of a U-bolt.

Such saddles generally do not encircle the main conduit completely. Bolt members 19 may typically be welded to a lower clamp 14, resulting in a gap or space between the upper and lower clamping components.

Utilization of pipes formed of plastic, such as PVC, can result in substantial distortion, with resultant premature failure and leakage.

The present invention addresses such problems of the prior art by the provision of a gasketed bell-end member extending outwardly as a part of the saddle, and secured by engagement with a lower clamp member disposed about the main conduit.

Respective embodiments of the invention utilize respective components and devices for securing the pipe to the saddle to prevent disengagement.

BRIEF DESCRIPTION OF THE DRAWINGS

FIG. 1 shows a prior art saddle assembly;

FIG. 2 is a sectional view of a central portion of the saddle arrangement of FIG. 1;

FIG. 3 is an elevational view of a preferred embodiment of the saddle assembly of the invention;

FIG. 4 is a sectional view taken at line 4—4 in FIG. 3;

FIG. 5 is a top view of the saddle assembly of FIG. 6;

FIG. 6 is an elevational view of another embodiment of the present invention;

FIG. 7 is a partial side view of the saddle assembly of FIG. 6;

FIG. 8 shows another embodiment of saddle assembly according to the invention;

FIG. 9 is a side view of the saddle assembly of FIG. 8;

FIG. 10 is an elevational view of another embodiment of the invention wherein an integral half-clamp is provided on a bell-end; and FIG. 11 is a sectional view of the integral half-clamp and bell-end portion of FIG. 10.

DESCRIPTION OF THE PREFERRED EMBODIMENTS

The invention provides novel saddle assemblies for mounting on liquid conduits, such as main lines of irrigation systems and the like.

The saddle is contoured to fit about a normally upper portion of such conduit and is secured by a clamp member secured to the saddle and extending about the conduit.

Referring to FIGS. 3 and 4, the invention provides a gasketed bell-end outlet extending outwardly from the saddle. Different embodiments have differing structural arrangements for retaining a pipe nipple in engagement with the gasketed outlet.

As shown, a saddle 20 has a bell-end portion 22 extending from a base 24 which is arcuate to fit about a normally upper portion of a conduit or main line 26.

A bell-end 28 defines a groove or race 28 wherein is mounted an annular resilient gasket seal 30. A pipe or nipple 32 is insertable into the saddle bell-end by simply urging it thereinto. The pipe may typically be connected to a lateral line extending from a main conduit or line 26 and may be connected with a lateral valve.

The pipe is readily orientable by rotation relative to the bell-end to orient it in any desired direction, as is typically required for irrigation systems lateral lines. No valve member is required in many irrigation assemblies.

The bell-end structure may typically be formed integrally with the saddle base 24, as shown. An annular seal 34 is disposed between an annular shoulder 36 of the saddle base and the conduit to provide sealing between the main conduit 26 and the bell housing.

In this embodiment, wings 37 extend from the bell-end 28 for the purpose of engaging any of a variety of locking connections or members (not shown), an example of such member being indicated in FIG. 8.

T-hook members 38 extend from a lower clamp member to engage shoulders 40 at an end portion of the saddle, as shown, thus enabling relative pivotal movement between the members. The opposite end portion of the saddle has a lug 42 threadedly secured by a threaded fastener and nut to a lug 44 of the lower clamp 46. This arrangement requires only one securement bolt.

Pipe insertion deforms the gasket 30 radially outwardly for easy pipe entry and insertion.

The gasket seal 30 provides a unique advantage in that it rolls over to a limited degree to provide a gripping action to resist or prevent pipe 32 from being disengaged from the bell-end 28.

Referring to FIGS. 5 and 6, an embodiment of the invention is shown which has some features in common with the embodiment of FIGS. 3 and 4, and like features bear like reference numbers. An annular, slotted ring 50 is cast integrally with the nipple or pipe or is welded thereto. Diametrically opposite slots 52 allow insertion of the pipe past the wings 37 of the bell-end by appropriate rotation of the pipe relative to wings. The pipe may be inserted into the saddle, then rotated to prevent the pipe from dislodging from the bell-end. The ring 50 coacts with the wings 37 to secure the pipe relative to the bell-end and gasket.

Referring to FIGS. 8 and 9, an embodiment 60 of the invention has wings 62 similar to wings 37 of the embodiment of FIGS. 6 and 7. Outwardly extending lugs engage bracket arms 64 which extend from clamp rings 66, 68 and are secured together by threaded fasteners. The outer lug portions of wings 62 are received in openings 63 of the bracket arms 64. The pipe 70 is thus secured against disengagement from the bell-end and seal. The ring 50 coacts with the wings 37 to secure the pipe relative to the bell-end and gasket.

FIGS. 10 and 11 show an embodiment wherein a modified bell-end 80 has formed integrally therewith a half-clamp 82, which is secured by threaded fasteners to a separate half-clamp 84, as shown. Integral half-clamp 82 enables ready insertion of a pipe 86 by one person by the positioning of the pipe end portion adjacent to the inner side 88 of the integral half-clamp 82, such positioning serving to position the pipe for insertion into the bell housing. The integral half-clamp is similar to the integral half-clamp of my co-pending application Ser. No. 09/444,223, filed Nov. 19, 1999. entitled "Fitting With Half Clamp For Pipe".

It will be understood that various changes and modifications may be made from the preferred embodiments discussed above without departing from the scope of the present invention, which is established by the following claims and equivalents thereof.

What is claimed is:

1. A saddle assembly for mounting on a liquid conduit, comprising:
   a base portion having a curved surface contoured to fit about a normally upper portion of a liquid conduit,
   clamp means to secure the base portion to the conduit,
   a bell-end outlet extending outwardly from the base portion,
   an annular resilient seal disposed in the bell-end outlet,
   a pipe disposed in and rotatably orientable relative to said bell-end outlet and said seal while maintaining sealing therebetween irrespective of the rotational orientation of the pipe, and
   means to prevent rotation of said pipe to an orientation wherein it can disengage from the saddle bell-end outlet, and
   a ring adjacent to said bell-end outlet formed
      (a) integrally with the pipe, or
      (b) welded to the pipe,
   said ring having diametrically opposite slots for retention of the pipe relative to the bell-end outlet by selective rotation of the pipe."

2. A saddle assembly according to claim 1 wherein the bell-end outlet extends generally transversely of the conduit.

3. A saddle assembly according to claim 1, wherein:
   an annular seal is disposed between a shoulder in the saddle base portion and said liquid conduit to provide sealing therebetween.

4. A saddle assembly according to claim 1, and further comprising:
   a pair of wings extending oppositely from the bell-end outlet for connection with and retention by a ring extending about said pipe,
   said ring being integral with the pipe and having diametrically opposite slots for insertion of the pipe past the wings for retention of the pipe relative to the bell-end outlet by selective rotation of the pipe.

5. A saddle assembly for mounting on a liquid conduit, comprising:
   a base portion having a curved surface contoured to fit about a normally upper portion of a liquid conduit,
   clamp means to secure the base portion to the conduit,
   a bell-end outlet extending outwardly from the base portion,
   an annular resilient seal disposed in the bell-end outlet,
   an unthreaded pipe disposed in and selectively orientable relative to the bell-end outlet and engaging said seal,
   a ring cast integrally with said pipe and having diametrically opposite slots for insertion of the pipe past the wings for retention of the pipe relative to the bell-end portion by selective rotation of the pipe, and
   means to prevent rotation of said pipe to an orientation wherein it can disengage from the saddle bell-end outlet.

6. A saddle assembly for mounting on a liquid conduit, comprising:
   a base portion having a curved surface contoured to fit about a normally upper portion of a liquid conduit,
   clamp means to secure the base portion to the conduit,
   a bell-end outlet extending outwardly from the base portion,
   an annular resilient seal disposed in the bell-end outlet,
   an unthreaded pipe disposed in and selectively orientable relative to the bell-end outlet and engaging said seal,
   a ring welded to said pipe and having diametrically opposite slots for insertion of the pipe past the wings for retention of the pipe relative to the bell-end portion by selective rotation of the pipe, and
   means to prevent rotation of said pipe to an orientation wherein it can disengage from the saddle bell-end outlet.

7. A saddle assembly for mounting on a liquid conduit, comprising:
   a base portion having a curved surface contoured to fit about a normally upper portion of a liquid conduit,
   clamp means to secure the base portion to the conduit,
   a bell-end outlet extending outwardly from the base portion,
   outwardly extending lugs on the bell-end outlet to engage bracket arms that extend from clamp rings secured about the pipe by threaded fasteners,
   an annular resilient seal disposed in the bell-end outlet,
   an unthreaded pipe disposed in and selectively orientable relative to the bell-end outlet and engaging said seal, and
   means to prevent rotation of said pipe to an orientation wherein it can disengage from the saddle bell-end outlet.

8. A saddle assembly according to claim 1, wherein:
   a lower clamp member on a lower portion of the conduit comprises a T-hook portion on an end portion thereof to engage shoulders extending inwardly from a lower end portion of the saddle base portion, and
   a threaded fastener securing together an opposite end portion of the lower clamp member and an opposite lower portion of the saddle base portion.

9. A saddle assembly for mounting on a liquid conduit, comprising:
   a base portion having a curved surface contoured to fit about a normally upper portion of a liquid conduit,
   a bell-end outlet extending outwardly from the base portion,
   an annular resilient seal disposed in the bell-end outlet,
   a pipe disposed in and rotatably orientable relative to said bell-end outlet while maintaining sealing therebetween,
   means to prevent rotation of said pipe to a position wherein it disengages from the saddle bell-end outlet, and
   a pair of wings extending oppositely from the bell-end outlet and outwardly for connection with and retention by a ring secured "about said pipe, said ring being secured about said pipe by being
      (a) integrally formed,
      (b) by welding."

10. A saddle assembly according to claim 9, wherein the bell-end outlet extends generally transversely of the conduit.

11. A saddle assembly according to claim 9, wherein an annular seal is disposed between a shoulder in the saddle base portion and said liquid conduit to provide sealing therebetween.

12. A saddle assembly according to claim 9, wherein said ring on the pipe cooperates with said wings to secure the pipe relative to the bell-end outlet.

13. A saddle assembly according to claim 9, wherein components are formed of metal.

14. A saddle assembly according to claim 9, wherein at least some components are formed of PVC.

15. A saddle assembly for mounting on a liquid conduit, comprising:

- a base portion having a curved surface contoured to fit about a normally upper portion of a liquid conduit,
- a bell-end outlet extending outwardly from the base portion,
- an annular resilient seal disposed in the bell-end outlet,
- a pipe being selectively orientable relative to the bell-end outlet,
- means to prevent rotation of said pipe to a position wherein it disengages from the saddle bell-end outlet,
- a pair of wings extending oppositely from the bell-end outlet and outwardly for connection with and retention by a ring secured about said pipe, and
- outer portions of said wings being received in openings in brackets extending from said ring about said pipe for securement of the saddle base.

16. A saddle assembly for mounting on a liquid conduit, comprising:

- a base portion having a curved surface contoured to fit about a normally upper portion of a liquid conduit,
- a bell-end outlet extending outwardly from the base portion,
- an annular resilient seal disposed in the bell-end outlet,
- a pipe disposed in and being selectively orientable relative to the bell-end outlet, and
- a half-clamp integral with the bell-end outlet, and
- a second separate half-clamp secured to the integral half-clamp by threaded fasteners, whereby insertion of a pipe into the bell-end outlet may be performed by one person by positioning a pipe end portion on the integral half-clamp for insertion into the bell housing.

17. A saddle assembly according to claim 16, wherein the bell-end outlet extends generally transversely of the conduit.

18. A saddle assembly according to claim 16, wherein said annular seal is disposed in a groove defined in the bell-end outlet.

19. A saddle assembly for mounting on a liquid conduit, comprising:

- a base portion having a curved surface contoured to fit about a normally upper portion of a liquid conduit,
- a bell-end outlet extending outwardly from the base portion,
- an annular resilient seal disposed in the bell-end outlet between a shoulder in the saddle base portion and said liquid conduit to provide sealing therebetween,
- a pipe disposed in and being selectively orientable relative to the bell-end outlet,
- a half-clamp integral with the bell-end outlet, and
- a second separate half-clamp secured to the integral half-clamp by threaded fasteners, whereby insertion of a pipe into the bell-end outlet may be performed by one person by positioning a pipe end portion on the integral half-clamp for insertion into the bell housing.

* * * * *